2,703,758

METHOD OF MAKING PECTIN SOLUTIONS

Herbert T. Leo and Clarence C. Taylor, Anaheim, Calif.

No Drawing. Application November 26, 1951,
Serial No. 258,297

1 Claim. (Cl. 99—132)

This invention relates to a method of making pectin solutions, and more particularly to a method of making a water solution of pectin, starting with a dry, non-water-soluble pectin.

In our copending application Serial No. 235,376, filed July 5, 1951, we have disclosed a method of making household jellies, jams and the like, from a prepared, dry, granular mixture consisting essentially of non-water-soluble porous pectin of 10 to 100 mesh, and preferably of 30 to 80 mesh, an edible organic oxy acid, and a water-soluble alkali metal salt of an organic oxy acid, such as sodium citrate. While such a pectin composition is admirably suited for use in the manufacture of household jellies, jams and the like, it is not well adapted for use in the manufacture of commercial jellies, jams and the like, on a large scale. In commercial operations, the operator prefers to buy the pectin already made into an aqueous solution. This is for the reason that dry pectin as made prior to our invention cannot readily be dispersed in water without the use of a separate dispersing agent, such, for instance, as sugar, or, where the pectin is itself strongly acid, an effervescent salt like sodium bicarbonate.

All dry pectins heretofore commercially produced have been ground to 80 mesh and finer, so that once they are dispersed in water, they will dissolve rapidly. However, when ground to that degree of fineness, the powdered pectins require special dispersing agents, such as just referred to, because they would otherwise lump badly when added to water. This is believed to be due to the occlusion of air on the surfaces of the powdered pectin, causing the powder, if fine enough, to float, or, if stirred under the surface of the water, to agglomerate into lumps that have dry interiors to which the water will not penetrate readily.

We have now found that if, instead of grinding to 80 mesh and finer, the pectin is ground to a mesh coarser than customary, such as between 30 and 80 mesh, or, more broadly, between 10 and 100 mesh, the pectin sinks quickly beneath the surface of the water like sand, and when stirred into plain water, disperses readily and does not tend to lump at any time. This is particularly true if the pectins used are those that are not soluble in plain water, either hot or cold. Such pectins can be made by the processes described in Patents Nos. 2,392,854 and 2,424,947. Even such non-water-soluble pectins, if ground to finer than 100 mesh, tend to lump when added to water, but if they are coarser than 100 mesh, they can be dispersed readily, without lumping, in either hot or cold plain water.

In order to effect the dissolution of such non-water-soluble pectins, once they are dispersed, an edible alkali metal salt of an organic oxy acid, such as sodium citrate, sodium tartrate, or the corresponding potassium salts, may be added to cause complete dissolution of the pectin. In our present method, the alkali metal salt of an organic oxy acid is used, not to effect dispersion of the pectin, since the coarse grinding accomplishes that, but to effect complete solution of the otherwise non-water-soluble pectin after it has been dispersed.

It is preferable, when carrying out our method, to start with a dry, non-water-soluble pectin, having the particle size indicated, that has a jelly grade of at least 200. This means that one pound of pectin will jell 200 pounds of sugar under proper jelly making conditions. When a pectin of a jelly grade of 200 or over is used, it is a simple matter by our method to produce an aqueous pectin solution having a jelly grade of at least 6¼. If the jelly grade of the starting pectin is 250, for instance, this would mean dissolving one part by weight of the pectin in a sufficient amount of water to give 40 parts by weight pectin solution, using a sufficient amount of the alkali metal salt of the organic oxy acid to effect such solution.

It is therefore an important object of our invention to provide a suitable method for making aqueous solutions of pectin on a commercial scale, starting with a dry, powdered pectin that is itself non-water-soluble.

Other and further important objects of this invention will become apparent from the following description and appended claims.

The starting material may be any pectin that is non-water-soluble in plain water, both hot and cold, and that is of at least 200 grade jelly strength. The pectin may be of high methoxy content or partially demethoxylated. Apple pectins are not naturally demethoxylated, whereas citrus pectins usually are partially demethoxylated due to the presence of pectase in the natural citrus fruit and the unavoidable demethoxylation caused thereby in nature and in processing before the action of the pectase is inhibited or destroyed and the pectin recovered. Since demethoxylated pectins are calcium susceptible, the greater the extent to which the pectin has been pectase-reacted, the less soluble the pectin is in acid alone. However, even a partially demethoxylated citrus pectin, or pectinic acid, is rendered completely water-soluble in accordance with our method. An amount of the alkali metal salt of an organic oxy acid, such as sodium citrate, is added that is sufficient not only to dissolve any aluminum hydroxide, or other metal hydroxide or oxide, that may be present in the pectin, but also to buffer the resulting water solution of the pectin to a sufficiently high pH value to put any partially demethoxylated pectin into solution.

The starting pectin should be of a particle size between 10 and 100 mesh, and preferably between 30 and 80 mesh. Substantially all of the pectin that is to be added in dry form should pass through a 30 mesh standard screen and remain on an 80 mesh screen. In dissolving the pectin, cold water may be used, but hot water is preferred because of the shorter length of time required for complete solution. Hot water is water at any temperature of between about 180° F. and 212° F.

As previously stated, the non-water-soluble pectin may be produced by the processes described in Patents Nos. 2,392,854 and 2,424,947. We prefer to start with a pectin that has been precipitated from a pectin extract made from citrus fruit, by the addition thereto of a soluble aluminum salt and by the proper control of the pH to bring about a co-precipitation of pectin and aluminum hydroxide as a pectin-aluminum complex. This complex comes out of solution as a curd, which is dropped into 40% alcohol to harden it. After being hardened, the co-precipitate can be easily broken up into small pieces.

After being broken up, the pectin-aluminum complex is washed with acidified alcohol to remove more or less of the aluminum that is present as Al(OH)₃. A sufficient amount of acidified alcohol having a pH between 0.5 and 2.0 is used to reduce the aluminum content of the pectin to a point at which the pectin still is not soluble but will disperse readily in plain water, either hot or cold, when of a particle size between 30 and 80 mesh. This property of dispersibility, as previously pointed out, is due first, to the water insolubility of the pectin, and, secondly, to the coarser particle size, to which we intentionally grind our pectin. The pectin is inherently of a porous character when prepared from a pectin-aluminum complex in the manner described.

After the last acidified alcohol wash, the pectin is brought to a somewhat higher pH, say, to around a pH value of 3.30 by the addition of ammonia to the final alcohol rinse. Thereafter, the washed, porous pectin is ground to a relatively coarse size, screened to collect all particles between about 30 and 80 mesh, and the coarser particles reground and rescreened. Anything finer than about 100 mesh is separated for a different use. The result is a non-water-soluble pectin in granular form of a particle size less than 100 mesh and substantially all of a particle size such that the pectin will pass through a 30 mesh standard screen but will remain on an 80 mesh standard screen. While a coarser grind, down as low as 10 mesh, can be used, it is preferable to employ a particle size that is free of any substantial proportion of fines above 100 mesh.

Since, to the best of our knowledge, there is no standard or accepted test for determining the fact that a given pectin is completely in solution, or is soluble or not soluble in plain water, we are giving below tests that we use.

In general, if a pectin is completely in solution, the solution is substantially clear and when poured slowly will form a continuous, clear stream tapering progressively from the pouring source to almost hair-like thinness without breaking its continuity. We term this "stringing." A pectin that is not completely water-soluble may appear to dissolve in water but will not "string" to give the continuous fine stream on slow pouring. Further, it will impart a pearl-like appearance to a mass of water into which it has been stirred, and a pebbly appearance in thin films, such as those formed during stirring on the wall of the beaker or glass container. In stating herein that our jelly making pectin completely dissolves in hot water (180° to 212° F.) within five minutes to give a solution of 6¼ jelly grade, we judge completion of solution in accordance with the above. When the solution is substantially clear, except for air bubbles, is free from a pearl-like appearance when viewed as a mass, or a pebbly appearance when viewed in thin films, and gives a stream tapering to hair-like thinness, it is considered to be in complete solution.

While an experienced jelly maker can judge by physical manifestations, such as the above, whether a pectin is in solution, or not, the test for solubility that we have developed is positive and definite, in that it is based upon the ability or inability of the given pectin to make a jell. Obviously, if the pectin will make a satisfactory firm jell under standardized conditions, it has been put into solution and it is therefore soluble, whereas, if it does not make a jell under those same conditions, it has not dissolved and is not soluble. The following is our test for the solubility:

SOLUBILITY TEST 28.4 grams of 100 grade pectin, or an equivalent weight of a higher grade pectin are added to a pint of hot plain water. Two such pint lots are separately prepared and stirred in a Waring blender for a couple of minutes, but to lot (1) no addition is made, while to lot (2) are added 1.4 grams of tartaric acid and 1.4 grams of sodium citrate, while stirring. 125 grams of each of lots (1) and (2) are then added to separate but identical hot batches of sugar and water in kettles, each consisting of 500 grams of sugar and 170 ml. of water. After boiling to exactly 777 grams to give a 65% sugar content, each batch is tested for quality of jelly by pouring from the kettles into 6 ounce jelly jars, two of which contain 2 cc. of 50% tartaric acid solution to give a finished jelly of about 2.50 pH, and two of which contain 2 cc. of 50% citric acid solution and 0.5 cc. of 25% sodium citrate solution to give a finished jelly of about 3.0 pH.

If under these conditions lot (1) does not form a satisfactory firm jelly in either of the jars into which it is poured, whereas lot (2) does, then the pectin tested is a non-water-soluble pectin within the meaning of the term as used herein, and is satisfactory for our purposes. If both lots give equally satisfactory firm jellies, then the pectin tested is water soluble and is not suitable for use in our method.

The following examples will serve to illustrate a method of making an aqueous solution of pectin in accordance with our invention. In each example, the pectin used as starting material is a non-water-soluble pectin, when judged in accordance with the test previously given herein, and the pectin is in dry, particulate form with the particles substantially all coarser than 100 mesh and preferably between 30 and 80 mesh. Also, preferably, the pectin used as the starting material is one that has been precipitated from a pectin extract made from citrus fruit by the addition thereto of a soluble aluminum salt, and the pectin-aluminum complex resulting therefrom has been processed as previously described herein. This pectin is inherently of a porous character.

*Example I*

Starting with a dry pectin as just described, which has a jelly grade of 250, 100 parts by weight of the pectin are stirred into 3875 parts by weight of water, with constant stirring. The water may be at room temperature or at any temperature up to the boiling point. It is not necessary to use distilled water, but plain tap water may be used without any addition to the water. The dry pectin disperses readily in the water and is maintained more or less uniformly dispersed, but not dissolved, therein due to the continued agitation. As soon as the dispersion is comparatively uniform, 25 parts by weight of sodium citrate are added in dry form and the agitation continued until complete dissolution of the pectin takes place.

The resulting aqueous solution of pectin amounts to 4000 parts by weight. Consequently, the solution itself has a jelly grade of 6¼. If a higher jelly grade is desired, a correspondingly less amount of water is used. Similarly, if a lower jelly grade of pectin were used, say 200 grade, instead of 250, the amount of water used would be adjusted correspondingly if it were desired to end up with a pectin solution of 6¼ grade.

*Example II*

In order to prepare a water solution of pectin having the proper amount of acidity to enable the solution to be used directly in the manufacture of jellies and jams, the solution is first made up as in Example I and then the required amount of an edible organic oxy acid added. The proportions by weight are as follows:

|  | Parts |
|---|---|
| 250 grade pectin | 100 |
| Water | 3800 |
| Sodium citrate | 25 |
| Tartaric acid | 75 |
| Total | 4000 |

In place of sodium citrate, other alkali metal salts of an edible organic oxy acid, such as potassium citrate or sodium or potassium tartrate, may be used. Likewise, citric acid can be used in place of tartaric acid to impart to the pectin solution the desired degree of acidity. The resulting pectin-acid solution can then be used in the making of jellies and jams in the same way as similar solutions have previously been used.

One of the important advantages of our method is that due to the use of a dry pectin, there is a saving in freight costs over the shipment of liquid pectin solutions, and there is no liability of deterioration during shipment or storage, as in the case with a prepared liquid pectin solution. With a dry pectin such as used in our method, there is no appreciable deterioration so that the pectin solution, when made up fresh, is always of the indicated grade strength.

Prior to our invention, it was not possible to make up a pectin solution by the direct addition of dry, powdered pectin to plain water, because with the finely ground powdered pectin heretofore available, the pectin would lump badly when added to water, unless special dispersing agents, such as sugar, were used. If it were attempted to disperse heretofore available finely ground pectin (80 mesh and finer) in water by itself and then add sodium citrate, the lumping would be even worse, since the sodium citrate tends to form a gelatinous coating over the lumps of the fine pectin and this coating prevents further dissolution, or even wetting of the interior of the lumps. The present method, therefore, for the first time makes use of a dry pectin that is itself non-water-soluble but is of sufficiently coarse particle size that it can be readily dispersed in a relatively small amount of water, without lumping, by means of slow stirring, and thereafter quickly dissolved by the addition to water dispersion of a solubilizing agent, such as sodium citrate or sodium tartrate. In large scale commercial operations for the making of jellies and jams, our method makes possible the use of pectin in dry form without the need of dispersing agents and without the need of any particular precautions other than simple agitation and the subsequent addition to the dispersion of the pectin of a solubilizing agent.

Our dry, porous, non-water-soluble pectin can be dispersed, with stirring, in as small a quantity of plain water as sixteen times its weight and then quickly brought into solution by the subsequent addition of from 20 to 30% of sodium citrate by weight of the pectin, either in dry form or in water solution, with continued stirring. The rate of stirring is preferably relatively slow, being in the neighborhood of 100 to 250 R. P. M., or slower. Such slow agitation is readily available in commercial jelly and jam making plants.

It will be understood that modifications and variations may be effected without departing from the scope of the novel concepts of the present invention.

We claim as our invention:

In the preparation of an aqueous solution of pectin, the steps which comprise providing a dry porous pectin derived from a pectin-aluminum complex and having an aluminum content such that the pectin is non-water-soluble, selecting such a pectin of a particle size substantially all between 30 and 80 mesh and having a jelly grade of at least 200, slowly stirring said dry pectin by itself into an amount of plain water such that a solution of at least 6¼ jelly units grade would result if complete dissolution of the pectin took place, continuing such stirring of said pectin until the same is thoroughly dispersed in said water without lumps and without being dissolved, and thereafter adding to said water dispersion of said pectin an amount of an edible alkali metal salt of an organic oxy acid between 20 and 30% by weight of the pectin sufficient by itself to effect complete dissolution of said pectin in such amount of water to produce a solution having a jelly grade of at least 6¼.

References Cited in the file of this patent

UNITED STATES PATENTS

| 2,392,854 | Leo et al. | Jan. 15, 1946 |

FOREIGN PATENTS

| 359,728 | Great Britain | Oct. 29, 1931 |